137-13 SR
7/13/76 XR 3,968,999

United States Patent [19] [11] 3,968,999
Keller [45] July 13, 1976

[54] METHOD OF MAKING AVAILABLE FUELS FROM ARCTIC ENVIRONMENTS

[75] Inventor: Leonard J. Keller, Sarasota, Fla.

[73] Assignee: The Keller Corporation, Dallas, Tex.

[22] Filed: Apr. 25, 1975

[21] Appl. No.: 571,754

Related U.S. Application Data

[63] Continuation of Ser. No. 405,682, Oct. 11, 1973, abandoned.

[52] U.S. Cl. .................... 302/66; 137/13; 166/DIG. 1; 302/14

[51] Int. Cl.² .................... B65G 53/30

[58] Field of Search .................... 62/55; 137/13; 166/DIG. 1; 302/14–16, 66

[56] References Cited

UNITED STATES PATENTS 3,517,969 6/1970 Wicks .................... 302/66
3,730,201 5/1973 Lefever .................... 137/13

*Primary Examiner*—Evon C. Blunk
*Assistant Examiner*—Jeffrey V. Nase
*Attorney, Agent, or Firm*—James C. Fails

[57] ABSTRACT

A method of making available economical fuels from arctic environments without melting the permafrost along a transportation right of way characterized by preparing a liquid fuel having a viscosity below 2 centipoises at 32°F; cooling and transporting the cold liquid fuel, with or without the admixing of a solid fuel therewith to form a cold slurry, through a pipeline at a temperature below 32°F through the frozen permafrost to a destination. The liquid fuel may be methanol synthesized from coal when the solid fuel is coal; or it may be a petroleum fraction where solid fuel deposits are adjacent an oil field or the like. Also disclosed are specific processes and systems for carrying out the invention.

2 Claims, 2 Drawing Figures

METHOD OF MAKING AVAILABLE FUELS FROM ARCTIC ENVIRONMENTS

This is a continuation of application Ser. No. 405,682, filed Oct. 11, 1973, and now abandoned.

CROSS REFERENCE TO RELATED APPLICATION OR DISCLOSURE DOCUMENT

This application pertains to my invention described in disclosure document No. 21,003, received in the U.S. Patent Office July 30, 1973, and entitled "Arctic and Subarctic Resource Development — Methods for Allowing Utilization of Fossil Fuel in Far Northern Climates."

BACKGROUND OF THE INVENTION

1. Field of the Invention

This invention relates to a method of making available economical fuels from arctic and subarctic environments without melting the permafrost along a transportation right of way. More particularly, this invention relates to processing and transporting steps to make available at a destination economical fuels from arctic and subarctic environments without melting the permafrost along a transportation right of way.

2. Description of the Prior Art

Early in man's history, he began to appreciate the advantages of external power. In the ensuing generations, many and varied were the approaches used to obtain power. The Industrial Revolution in the United States during the 19th century came about, in part at least, because of the ready availability of economical sources of energy.

Two recent developments in the U.S. have, however, brought about a re-evaluation of conventional technology. First, is the remarkable attention that has been devoted to improving our environment, reducing pollution and the like. The second is the so-called "energy shortage", evidenced by curtailment of deliveries of natural gas, gasoline and other petroleum products. An excellent discussion of these conventional sources of power, and their shortcomings is contained in an article entitled "Hydrogen: Its Future Role in the Nation's Energy Economy", W. E. Winsche, K. C. Hoffman, F. J. Salzano, SCIENCE, 29 June 1973, Vol. 180, No. 4093. Therein, the authors delineate the projected need for large scale economical sources of energy; such as, that derived from nuclear fission, solar or geothermal energy. The authors delineate the disadvantage of electricity; namely, the losses of up to 50 percent due to cost of transmission and distribution between the power generating plants and the destination. Moreover, electricity cannot be economically stored to level out the peaks and valleys of consumption. In that article, the authors go on to point out the desirability of hydrogen as a potential future fuel and delineate some of the cost considerations in manufacturing and distributing the respective fuels, or power sources.

It is becoming increasingly apparent that certain oil-rich areas of the earth may be able to exert a disproportionately large economical and political influence if a substitute is not found for the petroliferous fuels. One widely available substitute for the petroliferous fuels in coal. Moreover, in many cases, the coal contains less sulfur and other pollutants than the petroliferous fuels. The cost of mining and transporting coal over long distances has made it noncompetitive with crude oil heretofore, since crude oil was available at a cost of about 3 dollars a barrel. As crude oil increases in cost to 5 dollars a barrel or higher, coal becomes increasingly competitive as a source of fuel. For example, coal can be used as a fuel at a cost of about 20 cents per million British Thermal Units (BTU's). Large reserves of coal are available in the U.S.; notably, in the arctic and subarctic regions of Alaska. In these latter regions, however, the cost of mining and transporting the coal has been prohibitive, particularly in the summer when the top layers of the permafrost thaw to form the boggy morass through which vehicles can only difficultly manuever. It is known to transport aqueous slurries of coal containing up to as much as 60 percent by weight of coal. This has been termed "hydraulic" transport but has been disadvantageous, since the liquid phase was water and was not combustible. When the resulting slurry was employed it lowered combustion temperatures too much because of the water phase that had to be evaporated. If separation was attempted by quiescent storage, there were difficulties in obtaining separation of the coal from the slurry if the particles sizes were fine enough to flow as a true suspension, simulating a liquid flow.

The north slope of Alaska has large petroleum reserves; but these, too, are not readily available at destinations, such as seaports or the like, since pipelines have been delayed by environmentalists seeking to prevent the melting of the permafrost by transporting the heated flowable liquids through pipelines in the permafrost.

Thus, it can be seen that, despite the urgent need for more fuels and the ready availability of economical fuels in the arctic and subarctic environments, no completely satisfactory method has been provided to make these fuels available at destinations.

Summary of the Invention

Accordingly, it is an object of this invention to make available economical fuels from the arctic and subarctic environments without melting the permafrost along a transportation right of way and that is operable year around while alleviating the disadvantages of the prior art.

It is a specific object of this invention to make available fuel derived from coal deposits in the arctic and subarctic environments while alleviating the difficulties of the prior art attempts to do so.

These and other objects will become apparent from the descriptive matter hereinafter, particularly when taken in conjunction with the drawings.

In accordance with this invention, economical fuels from arctic and subarctic environments are made available at a destination by a multi-step process having processing and transporting steps. First, a liquid fuel having a viscosity of less than two centipoises at 32°F is prepared. Preferably, the liquid fuel comprises methanol that is synthesized using the coal as a primary ingredient in the process. The liquid fuel is then cooled to a temperature below 32°F and is pumped to a destination through a pipeline in the frozen permafrost without melting the permafrost along the pipeline right of way. Since the methanol is relatively more expensive than coal, per se, it is preferred that it be slurried with finely divided solid fuel, such as powdered coal, before being pumped through the pipeline in the permafrost. It is imperative that the slurry of coal and liquid fuel be at a temperature below 32°F and this may be effected by any suitable means. The easiest means is to cool the liquid fuel to a temperature sufficiently below 32°F that it can be admixed with the solid fuel to form a cold slurry at a temperature below 32°F.

Where oil fields or other naturally occurring sources of suitable liquid fuels are available, the liquid fuel may be processed from the hydrocarbon stream as a separate fraction. That fraction is cooled. The coal is slurried thereinto. The cold slurry is then pumped at the above described temperature below 32°F through the pipeline in the permafrost.

DESCRIPTION OF PREFERRED EMBODIMENTS

Figure 1:
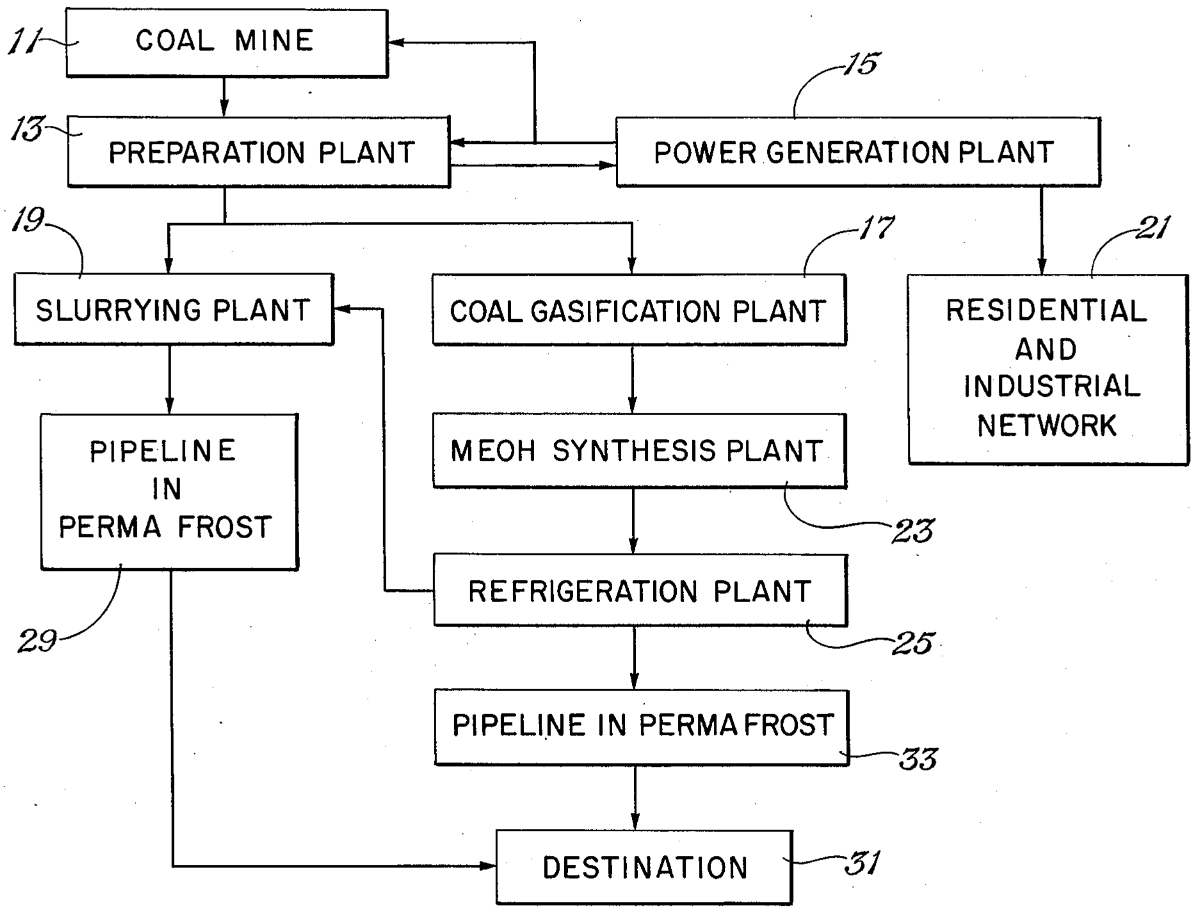
FIG. 1 is a schematic block diagram showing one embodiment of this invention, employing primarily coal deposits.

One embodiment of this invention can be understood clearly from the schematic block diagram of FIG. 1. Therein, coal is mined in coal mine 11 and transported to a preparation plant 13. The prepared coal is then sent to three different destinations, the power generation plant 15, the coal gasification plant 17 and the slurrying plant 19.

At the power generation plant 15, the coal is burned to provide electrical power in conventional power generation apparatus; such as, the coal fired boilers, superheaters, and Rankine cycle turbine-generator combinations. Generators are connected through appropriate circuit boards, transformers, controls and the like to the necessary residential and industrial network 21. The network 21 includes a connection back to operate equipment in the coal mine 11, as well as elsewhere in the overall apparatus illustrated in block form in FIG. 1. As noted hereinbefore, the transmission of electrical power over long distances to a destination is not totally satisfactory; for example, because of the high losses and lack of storage capability.

The coal is gasified in the coal gasification plant 17 to produce coal gas and, ultimately, the synthesis gas or the like that will be employed in the methanol (MEOH) synthesis plant 23 that is connected downstream of the coal gasification plant 17.

The coal that is sent to the slurrying plant 19 is pulverized further to a fine powder for admixing with cold methanol.

Methanol is formed in the methanol synthesis plant 23 from the gas supplied by the coal gasification plant 17. The methanol that is thus prepared is sent to the refrigeration plant 25 for being chilled.

In the refrigeration plant 25, the methanol is cooled to a first temperature that is sufficiently below 32°F that it can be admixed with a predetermined first proportion of the coal at the slurrying plant 19 and have a resulting slurried admixture that is less than 32°F temperature. The coal at the slurrying plant 19 will have a first predetermined temperature that is relatively constant. The first temperature can be calculated from the proportions and specific heats of the methanol and coal that will be in the slurry. On the other hand, the first temperature can be determined empirically by admixing the desired proportions with different first temperatures until a satisfactory cold slurry at less than 32°F is produced. For example, the coal powder in the slurrying plant 19 may have a temperature of about 35°–40°F; the methanol may be cooled in the refrigeration plant 25 to have a temperature of about 0°F; and the resulting admixture will have a temperature of less that 32°F so that it will not melt the permafrost when flowed through a pipeline in the permafrost, denoted by block 29, FIG. 1.

The cold methanol is sent from the refrigeration plant 25 to have the coal powder slurried thereinto in the slurrying plant 19. The resulting cold slurried admixture is then pumped through the pipeline 29 in the permafrost to a destination 31.

If desired, any excess methanol prepared in the methanol synthesis plant 23 may be cooled below 32°F and transported to the destination 31 by the same or similar pipeline in the permafrost without melting the permafrost. As illustrated, a separate pipeline 33 is employed for the methanol to prevent adverse dilution effects by having an excess of methanol in the pipeline 29 carrying the cold slurry of coal and methanol. If desired, a single pipeline may be operated to transport the cold methanol and the cold methanol-coal slurry respectively and intermittently. The latter may be preferable to installing an additional pipeline, or to "looping" the pipeline.

While each of the respective operational steps and plants; such as, for physically admixing a solid and a liquid; are known and the descriptive matter hereinafter may be unnecessary, some amplified details are afforded under the heading of "Process Details", immediately hereinafter.

Process Details

The mining and preparation of coal is described at some length in Kirk-Othmer "Encyclopedia of Chemical Technology", Second Edition, Anthony Standen, Editor, Interscience Publishers, New York, 1969, Vol. 5, Pages 606–676; and that descriptive matter is incorporated herein by reference. The coal is mined from coal mine 11 by either strip or underground methods, as appropriate to the respective deposit. These methods are conventional and are described on page 660 of the aforementioned Kirk-Othmer Encyclopedia.

The preparation of the coal is described at page 661 in the above referenced Kirk-Othmer Encyclopedia. One advantage of this process is that it can employ the fines that were formerly discarded because of customer objection. The exact nature of the coal in the coal deposits in Alaska has not been completely characterized, even though the deposits are known to be extensive. If the coal has large amounts of fusinite, it will be extremely friable, and will tend to concentrate in the fine size ranges during the preparation. This is helpful in the process of this invention, since the fines can be sent directly to the slurrying plant 19 to reduce the amount of additional work required in pulverizing the coal for forming the slurry with the methanol. Similarly, any appreciable amounts of vitrinite will readily break into fine sizes of less than 1 millimeter to reduce the work of additional size reduction and comminution required to get the desired particle size. As is known, in making the fine particles, the amount of work is indicated by the Hargrove Index. Specifically, a low Hargrove Index indicates that more energy will be necessary in a pulverizing mill to create the coal powder. It is understood that the Alaskan coals have a relatively high Hargrove Index; and, hence, should require relatively low power to pulverize.

The cleaning of the coal may be less a problem, also, in this process; since the power generation plant 15 may be disposed closely adjacent the preparation plant 13 to reduce problems with dusting and the like. The on site power generation plant reduces the problem of disposing of ash and the like from the boilers where the coal is burned. Where the coal is to be cleaned, as for the coal gasification plant 17 and slurrying plant 19, any of the conventional methods may be employed. For example, washing tables are frequently employed for the fines. The methods of cleaning are described at page 662 of the above referenced Kirk-Othmer Encyclopedia. The coal may be dry cleaned to eliminate drying but there frequently results a dusty condition from the air being blown through the oscillating perforated tables in the dry cleaning. Preferably, froth flotation will be employed in the cleaning operation, particularly for preserving the fines. Where it is desired to reduce the water contained on the cleaned coal, dewatering may be employed. Ordinarily, a certain proportion of water can be tolerated, particularly in the slurrying plant 19 because the methanol will tend to take up, or dissolve, the water. In fact, the methanol will take up the water and will frequently enable the direct reduction in size of certain low grade coals, such as lignite and the like. Thus, the dewatering operation may comprise simply vibrating screens or centrifuges, and avoid the necessity for thermal drying. Thermal drying may be employed, however, where the coal is to be sent to the coal gasification plant 17.

The gasification of the coal is also described in the above referenced Kirk-Othmer Encyclopedia and in numerous other publications, the contents of which are incorporated hereinto by reference. There have been a host of recently reported developments facilitating gasification of coal; alone and including refinements, such as methane synthesis. For example, the OIL AND GAS JOURNAL alone has carried a plurality of such reports in 1972–1973; see issues of July 24, 1972 reporting cutting cost of synthetic natural gas (SNG) by one-half; Oct. 16, 1972 re sequential-step gasification process; and Jan. 22, 1973 re "The Lurgi Process Route Makes SNG from Coal", pages 90–92, including flow diagrams and gasifier vessel cross section. In these reported processes, steam and/or industrial oxygen is employed to produce carbon monoxide and hydrogen in accordance with Equation I:

$$HOH\ (steam) + O_2 + 3C\ (coal) \rightarrow 3CO + H_2 \qquad I.$$

A portion of the gas is subjected to a shift reaction with steam to produce hydrogen, for hydrogen enrichment; in accordance with equation II:

$$CO + HOH\ (steam) \rightarrow CO_2 + H_2 \qquad II.$$

The $CO_2$ is scrubbed from the gaseous product, leaving hydrogen. The hydrogen is admixed with the gaseous product of Equation I to produce the desired ratio of $H_2$ to CO before being sent to the methanol synthesis plant 23 for the synthesis of methanol.

In the methanol synthesis plant 23, the respective constituents, such as carbon monoxide and hydrogen, are combined to synthesize the methanol. This synthesis of methanol is described at pages 370–398 of Vol. 13 of the above referenced Kirk-Othmer Encyclopedia and that descriptive matter is incorporated hereinto by reference. Ordinarily, the carbon monoxide and hydrogen will initially come from a synthesis gas prepared from the gasification of coal in the coal gasification plant 17. As indicated, care must be taken to control the ratio of hydrogen to carbon monoxide, the temperature and the pressure to obtain better yields of methanol. For example, in a conventional process, the thermodynamics favor methanation when the hydrogen and carbon monoxide are sought to be combined with a ratio of hydrogen to carbon monoxide greater than about 2. Nevertheless, yields of from 12–15 percent of that theoretically possible are obtained on single passes, with as much as 26 percent being reported. In addition, the respective off-gases can be recycled if they are not employed for fuel to obtain excellent results. For example, if methanation occurs, the methane that is produced is an excellent constituent for the synthesis of methanol. The newer processes, such as the Imperial Chemical Industries, Ltd. (ICI) Low Pressure process developed circa 1966–7, achieve even better results.

The methanol synthesis reaction can now be carried out over an improved catalyst at 200°–300°F and only 3,000 or less pounds per square inch (psi); contrasted with the older conventional processes that required 400°F and 8,000 psi. Pressure can be lower if the temperature is higher. The new ICI Low Pressure process has been and is being employed commercially and is described in printed publications, the pertinent portions of which are incorporated herein by reference, so it need not be described in detail herein.

For example, Jim Morrison reports in an article entitled "Here's How ICI Synthesizes Methanol at Low Pressure", OIL AND GAS JOURNAL, Vol. 66, Pages 106–9, Feb. 12, 1968 on one commercial installation. He reported the ICI Low Pressure process operated on steam-naptha reforming, but was operable on any source of CO and $H_2$ in the proper proportions. It employed a copper catalyst instead of the usual zinc-chromium catalyst and operated at 480°F and only 710 psi. The process, including economical refining steps, produces methanol of 99.85 percent purity. The synthesis of methanol from methane is also described in the above referenced Kirk-Othmer Encyclopedia and that descriptive matter is also incorporated herein by reference. Regardless of the process employed, very little energy need be wasted in either the coal gasification plant 17 or the methanol synthesis plant 23, since any such energy can be employed in either the power generation plant 15 directly, the coal gasification plant 17 or the refrigeration plant 25, as well as elsewhere in the overall system.

The standard heat exchange apparatus is employed in the refrigeration plant 25. For example, heat exchange coils and fans may be employed directly to make use of cold ambient air to cool the methanol with very little energy requirements when such cold air is available. Conventional refrigeration employing conventional refrigerants; such as, the halo substituted hydrocarbons like the Freons can be employed to cool off the methanol. Suitable refrigerants include tetrafluoromethane, monochlorotrifluoromethane, monobromotrifluoromethane, monochlorodifluoromethane, dichlorodifluoromethane, dichlorotetrafluoroethane, dichloromonofluoromethane, trichloromonofluoromethane and trichlorotrifluoroethane. These refrigerants are conventionally available and their selection and use in conventional refrigeration apparatus will be tailored to the temperatures needed in the heat exchanger. For example, it is widely known that the temperatures in Alaska may run from 60° or higher in the summer to −50° or lower in the winter. Normally, the refrigerant will be employed only when the temperatures are not low enough to cool the methanol adequately by conventional ambient heat exchangers. The methanol has an excellent heat transfer coefficient when flowed in heat exchange apparatus alone. For this reason, it is preferable to pre-cool the methanol rather than cooling the resulting slurry formed by the addition of the coal thereto.

In the slurrying plant 19, the coal is reduced in size by conventional equipment to a sufficient fineness, or powder, such that when admixed in the proper proportions it will tend to remain in suspension in the methanol and will not separate or settle out. Specifically, the coal may be further crushed and ground, finally employing pulverizing mills or the like such that the resulting coal dust will pass through a 200 mesh screen, designated as −200 mesh coal dust. With this size and smaller, the surface phenomena more than compensate for the differences in density and lack of mobility such that a slurry prepared therefrom acts more nearly like a true liquid in its flow behavior. For example, the slurry formed by a proper proportion of the coal in the methanol can be allowed to sit for long periods of time without settling or floating of the solids, imitating the behavoir of true suspensions in the physical chemistry sense.

The slurry that is formed by adding of the coal powder to the methanol will have a sufficient amount of the coal such that the suspension is formed. If the mixture of coal and methanol is too dilute, or contains too little coal powder, the solid separates more readily from the liquid phase. For most markets, it is desirable that as much coal be slurried into the methanol as is pumpable, since the coal has the price of only 20 cents per million BTU's as indicated hereinbefore, whereas the methanol costs about 90 cents per million BTU's. I have found an excellent slurry is provided when about 40–60 percent by weight of coal is admixed with 60–40 percent by weight of methanol. This provides a pumpable slurry in which the suspension of coal powder does not tend to settle out intolerably, yet effects excellent results as a fuel at the destination.

The resulting slurry may be accumulated in storage tanks or the like in order to have surge capacity to run the pipeline 29 and the respective pump stations therealong.

The slurry is pumped into the pipeline, as well as having its pressure elevated at stages along the pipeline if of sufficient length, by conventional pumping means. For example, centrifugal pumps with conventional wear resistant coatings, such as silicon carbide, or Stellite, on their impellers may be employed advantageously in the pumping means for pumping the coal slurry through the pipeline 29 to the destination 31. If desired, positive displacement pumps, such as are employed in pumping drilling muds or cement slurry, can be employed. The pipeline 29 will be formed of conventional materials, such as wrought iron pipes, that have been joined and laid along the right of way in accordance with conventional engineering standards and criteria.

The destination 31 may comprise any suitable facility, such as a storage and shipping facility, or one or more using facilities. It may comprise a combination of these if desired. Ordinarily, it will be advantageous to provide a "warm water" shipping facility for loading large ships and the like for shipment to other parts of the world. On the other hand, the destination 31 may comprise rail or truck loading depots for subsequent transportation of the fuel slurry to distant markets. If the destination 31 is a using facility in the arctic or subarctic environment, the methanol through the pipeline 33 may be heated and employed as a heating medium for heating buildings, agricultural land, greenhouses and the like because of its superior heat transfer coefficients. Thereafter, the methanol may be employed as a fuel. Similarly, the coal-methanol slurry may be employed as a fuel in a power plant that generates steam, electricity, or other power. Steam may be employed to heat the methanol, or for other purposes. The electricity may be employed in commercial, residential, and agricultural uses in accordance with conventional practice.

The operation is believed clear from the foregoing descriptive matter, particularly when taken in conjunction with conventional technology that is incorporated hereinto by reference.

Another Embodiment

Figure 2:
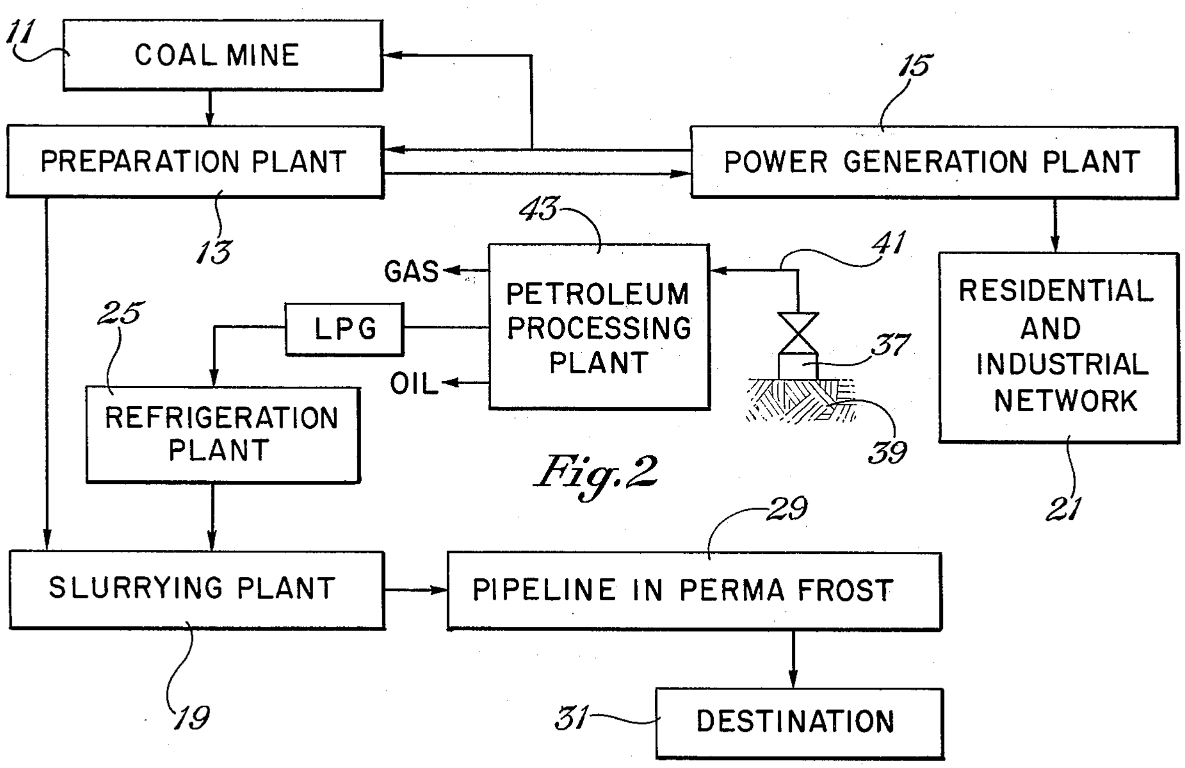
FIG. 2 is a schematic block diagram of another embodiment of this invention employing coal deposits in conjunction with nearby oil fields.

Another embodiment of this invention is illustrated in FIG. 2. In FIG. 2, the coal is mined from coal mine 11 and sent to the preparation plant 13. The prepared coal is then sent to the power generation plant 15 which supplies electrical power for operation of the equipment in the coal mine, as well as the residential and industrial network 21, similarly as described hereinbefore with respect to FIG. 1.

In the embodiment of FIG. 2, however, petroleum is produced from the well 37 penetrating subterranean formations 39 and completed in a reservoir containing oil, gas or both. The petroleum is supplied through pipeline 41 to a petroleum processing plant 43 where the petroleum is separated into its different fractions.

As illustrated, the petroleum is separated into an oil, or heavy ends fraction designated OIL; into a light ends, or liquid fuel fraction, designated LPG; and into a gaseous fraction, designated GAS. The liquid fuel is thus a petroleum fraction that can be thought of as liquefied petroleum gases. It may include ethane, propane, butane, pentane, hexane and heptane; but, ordinarily, is a mixture of several of these constituents. The liquid fuel fraction is sent to the refrigeration plant 25 where it is cooled to a temperature sufficiently low that it can be slurried with the coal, in accordance with the criteria delineated hereinbefore. Thereafter, the cold liquid fuel, or LPG, is sent to the slurrying plant 19.

One portion of the coal is sent from preparation plant 13 to the slurrying plant 19 also. At the slurrying plant 19, the coal is further comminuted to create a coal powder in accordance with the specifications delineated hereinbefore. The powder is admixed with the liquid fuel from the refrigeration plant 25 in the desired proportion to form a flowable slurry that can be pumped through the pipeline 29 without intolerable settling out of the coal.

The resulting slurry is pumped through the pipeline 29 in the permafrost to the destination 31, as described hereinbefore with respect to FIG. 1. Suitable surge tanks are employed at the respective pumping facilities as described hereinbefore to allow flexibility in operation of the manufacturing steps and the pumping steps, as desired.

The major plants have been described hereinbefore with respect to FIG. 1 with the exception of the petroleum processing plant 43. The petroleum processing plant 43 may take almost any form depending upon the nature of the petroleum being produced. For example, the petroleum may be primarily a gas condensate reservoir in which case the petroleum processing plant 43 will be merely a separation facility with the bottoms being the desired liquid fuel and gas coming off the top of the separators in the separation facility. On the other hand, it may comprise a conventional petroleum processing plant in which an oil fraction and a liquid fraction are produced but in which the oil fraction is too heavy, or contains too many high boiling constituents to serve satisfactorily as the liquid fuel. In such an instance, a conventional distillation column or the like with suitable reboilers and refluxing condensers will be employed to separate the liquid phase into the desired liquid fuel and the heavier ends. Of course, the petroleum processing plant may comprise a small refinery or the like having the complete capability of separating all of the constituents into their respective streams.

While the method has been described hereinbefore with respect to employing coal directly in the power generation plant 15, it will be obvious that other fuels, such as the gases produced in the coal gasification plant or the off-gas from the methanol synthesis plant could be employed as fuels if desired. Ordinarily, employing the coal directly is the most economical.

While the pre-cooling of the methanol has been described hereinbefore, it is apparent that the slurry formed by addition of the coal powder to the methanol may be cooled by subjecting it to storage under cold ambient temperatures, or cooled under other conditions such that the tendency of the coal powder to foul the heat exchange equipment is avoided.

This invention may present rather dramatic long range capabilities and phenomenal potential for the development of the arctic or subarctic environments within a few hundred miles of any substantial coal deposits. The prospective users in such environments can have virtually unlimited and economical electrical and heat energy available for heating homes and other habitable buildings, for heating and lighting enclosed farms (greenhouses), for heating the soil for open farming to extend the growing season, to guard against frost and freezing damage and to accelerate growth rates during the growing period. Moreover, fuel may be produced and exported from the artic environments where it has been heretofore economically infeasible. As an example, Alaskan coal could fuel electrical power generating plants on the western coast of the U.S. and provide low cost electric power and very low exhaust gas pollution levels. Environmentally and economically, this would be preferable to nuclear power plants and without their hazards.

The advantages of the coal-methanol fuel are worth delineating. The coal is economical and, the Alaskan coal; for example, is relatively nonpolluting; since it has very low sulfur content. The coal is very economical when the transportation costs can be held to a desirable level, as with this invention. The methanol that forms the liquid phase of the slurry burns with a clear colorless flame and substantially no pollution. Moreover, the methanol-coal slurry burns with a lower flame temperature, consequently, causing less pollution with the nitrogen oxides than the conventional fuels. Methanol has an octane rating within the range of 92–106. It is a high performance fuel and can be burned with about one tenth of the emissions of gasoline in present engines. It can be burned in conventional automobiles with a very small conversion cost, as well as burned in other facilities employing gaseous or liquid fuels now available. Methanol is a prime candidate for generating electricity in fuel cells. In fact, methanol is one of the few known fuels suited to fuel cell power generation. Yet, methanol can be stored and shipped much more easily than hydrogen, another fuel suitable for fuel cell power development. Recently, a fuel cell has been developed that gives more than 30,000 hours of continuous operation on methanol and air, employing a tungsten carbide and charcoal electrodes and sulfuric acid as the electrolyte. The methanol, similarly as the methanol-coal slurry, presents no problem in storage and shipment and can be contained in conventional fuel tanks and transported by any conventional means, such as tank cars, tank trucks, tankers, oil and chemical pipelines, or ships or the like.

From the foregoing descriptive matter, it can be seen that this invention provides the objects delineated hereinbefore and has significant advantages that could dramatically alter the long term energy picture in the U.S., while simultaneously improving the environment through lower polluting emissions or the like.

Although this invention has been described with a certain degree of particularity, it is understood that the present disclosure has been made only by way of example and that numerous changes in the details of construction and the combination and arrangement of parts may be resorted to without departing from the spirit and the scope of this invention.

What is claimed is:

1. A method of making available economical fuel from arctic and subarctic environments without melting the permafrost along a transportation right of way comprising the steps of;

a. preparing a liquid fuel comprising methanol;
b. preparing a solid fuel comprising coal of −200 mesh particle size;
c. forming a cold combustible mixture of said liquid fuel and said solid fuel at a temperature of less than 32°F.; including the steps of admixing and cooling said coal and said methanol; and
d. pumping the cold combustible mixture through a pipeline in the frozen permafrost at a temperature below 32°F. to a destination.

2. The method of claim 1 wherein said cold combustible mixture of said liquid fuel and said solid fuel at a temperature less than 32°F. is formed by the steps of:

a. cooling said liquid fuel to a low temperature sufficiently below 32°F. that it can be admixed with a predetermined first proportion of said solid fuel at a first predetermined temperature and have the resulting admixture be at a second temperature less than 32°F; and
b. admixing the cooled said liquid fuel at said low temperature with said predetermined first proportion of said solid fuel at said first predetermined temperature to form said cold combustible mixture at said second temperature less than 32°F.

* * * * *